United States Patent [19]

Dohi et al.

[11] Patent Number: 4,554,301

[45] Date of Patent: Nov. 19, 1985

[54] MODIFIED TWO-PART TYPE ADHESIVE COMPOSITION

[75] Inventors: Hidemi Dohi; Hideaki Matsuda, both of Kagawa, Japan

[73] Assignee: Okura Kogyo Kabushiki Kaisha, Japan

[21] Appl. No.: 591,261

[22] Filed: Mar. 19, 1984

[30] Foreign Application Priority Data

Mar. 22, 1983 [JP] Japan .................................. 58-45945

[51] Int. Cl.$^4$ .............................................. C08K 5/20
[52] U.S. Cl. .................................... 524/210; 524/394; 525/63; 525/126; 525/168; 525/260; 525/261; 525/263; 525/286; 525/287
[58] Field of Search ................... 524/210, 394; 525/63, 525/126, 168, 260, 261, 263, 286, 287

[56] References Cited

U.S. PATENT DOCUMENTS 4,223,115  9/1980  Zalucha et al. ...................... 524/139
4,322,509  3/1982  Zalucha et al. ...................... 525/287

Primary Examiner—Jacob Ziegler
Attorney, Agent, or Firm—Jacobs & Jacobs

[57] ABSTRACT

There is provided a modified two-part type adhesive composition comprising liquid I composed of an acrylic monomer, an organic peroxide, and, if necessary, a gelation stabilizer and liquid II composed of an acrylic monomer, a curing accelerator, and, if necessary, a gelation stabilizer, at least one of the liquids containing a modified nitrile rubber in an amount of 2 to 50% by weight, and said modified nitrile rubber having carboxyl groups and the carboxyl groups being bonded to a (meth)acrylic group-containing acid phosphate through partially a covalent bond and partially an ionic bond.

13 Claims, No Drawings

MODIFIED TWO-PART TYPE ADHESIVE COMPOSITION

FIELD OF THE INVENTION

This invention relates to a novel two-part type adhesive composition suitable for structural uses having excellent adhesive property.

BACKGROUND OF THE INVENTION

Recently, two-part type adhesives called "second-generation acrylic adhesives" have been developed. These adhesives are usually composed of the combination of an acrylic manner, an elastomer, an organic peroxide, and a curing accelerator and these adhesives are generally classified into the following two kinds according to the kinds of the elastomers used. One of the adhesives contains chlorosulfonated polyethylene as the elastomer and has a mechanism of forming a radical at the side chain of the elastomer at curing and an acrylic monomer graft-polymerizes to the radical (e.g. U.S. Pat. No. 3,890,407). This type of adhesive has excellent adhesive property but, on the other hand, has the fault that chlorine is released from the adhesive by preserving the adhesive for a long period of time or by heating it at high temperature since chlorosulfonated polyethylene is used as the elastomer and the adhered surface of a metal is corroded by the action of chlorine to reduce the adhesive strength. For avoiding the occurrence of the fault, it is attempted to add an epoxy compound as a dechlorinating absorbent to stabilize the adhesive but the sufficient effect is not obtained. Another type of adhesive contains a diene series elastomer such as a nitrile rubber, etc. (e.g. U.S. Pat. No. 3,832,274), but the chemical bonding of the diene series elastomer and an acrylic monomer is insufficient as compared to the case of using chlorosulfonated polyethylene and the adhesive strength is not satisfactory.

The inventors made various investigations for developing high-quality novel two-part type acrylic adhesives without accompanying with the foregoing faults in conventional techniques on the second-generation acrylic adhesives. That is, since when a nitrile rubber having no chlorosulfone group was used as an elastomer which was one of the components of the adhesives and methacrylic groups or acrylic groups (hereinafter, is referred to as (meth)acrylic group) were introduced into the molecule of said nitrile rubber, the grafting reaction or the partial crosslinking reaction certainly occurred by adhesion and also dechlorinating reaction by heat decomposition did not occur, the inventors considered that the adhesives had good adhesiveness and good heat resistance. For introducing (meth)acrylic groups into the molecule, a method by an ionic bond was first employed.

As acrylic adhesives having ionic bond, there are one-part type anaerobic adhesives previously proposed by the inventors (see, U.S. Pat. Nos. 3,899,382 and 3,933,748). These adhesives had excellent adhesive strength and adhesion for oily surfaces owing to the effect of the ionic bond but since the cured product thereof was lacking in flexibility, the adhesives were unsuitable as the adhesives for structural uses.

Thus, the inventors turned our attention to a nitrile rubber having a good flexibility and carboxyl groups in its molecule, and obtained the modified nitrile rubber having the desired (meth)acrylic groups in its molecule by neutralizing the carboxyl groups of the nitrile rubber with a metal compound or an amine in the presence of a compound having a (meth)acrylic group and an acid group in its molecule. And it was found that the two-part type acrylic adhesive prepared by using the nitrile rubber thus obtained showed excellent properties.

In this case, it was also found that when a (meth)acrylic group-containing acid phosphate shown by the general formula (I)

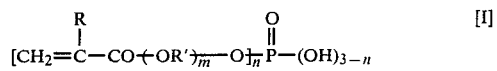

(wherein R represents a hydrogen atom or a methyl group; R' represents an alkylene group having 2 to 4 carbon atoms; m is an integer of 1 to 8; and n is 1 or 2) was used as the compound existing in the foregoing neutralization, the adhesive obtained showed very excellent adhesive strength. However, as the results of applying a long water resisting test and a weather resisting test to the adhesive, there was a tendency of reducing the adhesive strength to some extent as the case of the conventional nitrile rubber series second-generation acrylic adhesives. Therefore, this type of adhesives were also dissatisfactory according to the using purposes.

Therefore, it was investigated to introduce a (meth)acrylic group not only through an ionic bond but also through a covalent bond. As the result of various investigations for introducing a (meth)acrylic group through a covalent bond, it was succeeded in introducing a (meth)acrylic group into the foregoing carboxyl group-containing nitrile rubber through an amide group by addition condensing the carboxyl group of the nitrile rubber and the isocyanate group of the isocyanate group-containing (meth)acrylate. However, when the amount of the isocyanate group-containing (meth)acrylate was over 0.2 equivalent per equivalent of the carboxyl group in the nitrile rubber, a gelation sometimes occurred during the reaction according to the compositions of the reactants and hence it was difficult to introduce a large content of a (meth)acrylic group through a covalent bond.

SUMMARY OF THE INVENTION

Thus, as the results of further continuing the investigations, the inventors have succeeded in introducing a (meth)acrylic group into the foregoing carboxyl group-containing nitrile rubber through an amide group at any desired ratio by adding a diisocyanate to the mixed system of the nitrile rubber and the (meth)acrylic group-containing acid phosphate and performing the addition condensation reaction among them. Also, when a two-part type acrylic adhesive was prepared using the modified nitrile rubber having (meth)acrylic groups introduced therein through the ionic bond and the covalent bond thus prepared and the properties of the adhesive were measured, it has been discovered in the adhesive, not only the faults in conventional techniques but also the foregoing faults in water resistance and weather resistance are overcome and a novel two-part type acrylic adhesive having further excellent adhesive strength and adhesion for oily surface as compared to the conventional second-generation acrylic adhesives is obtained and based on the discovery, the inventors have succeeded in obtaining this invention.

The excellent properties of the two-part type acrylic adhesive of this invention are considered to be caused by that since the graft polymerization through an ionic bond and further the graft polymerization through a covalent bond occur, the remarkable increase of the adhesive strength and the effect of imparting an adhesion for oily surface by the former are further improved by the latter, whereby the problems of water resistance and weather resistance, which are the faults in the former, are solved. In the case of introducing a (meth)acrylic group to the carboxyl group-containing nitrile rubber by both the ionic bond and the covalent bond, it is preferred from the view point of workability to first introduce by a covalent bond and then introducing by an ionic bond and also as to the ratio thereof, it is preferred that the covalent bond is 0.05 to 0.5 equivalent per equivalent of the carboxyl group in the carboxyl group-containing nitrile rubber.

In addition, examples of using an acid phosphate containing a (meth)acrylic group are known by, for example, Japanese Patent Publications Nos. 29,490/'72, and 45,726/'72 by the same inventors and examples of using the acid phosphate for the second-generation acrylic acid adhesives are also described in, for example, U.S. Pat. No. 4,223,115. However, in these cases, the foregoing acid phosphate is simply added to an adhesive composition or there are no examples of introducing the acid phosphate into the molecule of the nitrile rubber by the covalent bond and the ionic bond as in the present invention, and hence the remarkable effects as in the present invention are not obtained.

That is, according to this invention, there is provided a modified two-part type adhesive composition comprising liquid I composed of an acrylic monomer, an organic peroxide, and, if necessary, a gelation stabilizer and liquid II composed of an acrylic monomer, a curing accelerator, and, if necessary, a gelation stabilizer, at least one of the liquids containing a modified nitrile rubber in an amount of 2 to 50% by weight, and said modified nitrile rubber having carboxyl groups and the carboxyl groups being bonded to a (meth)acrylic group-containing acid phosphate through partially a covalent bond and partially an ionic bond.

DESCRIPTION OF THE PREFERRED EMBODIMENT

Then, the features of the compositions of this invention and the effects thereof are described in detail.

Now, the modified nitrile rubber employed in this invention is a modified nitrile rubber in which a (meth)acrylic group is introduced into the molecule thereof by a covalent bond by adding a diisocyanate to a mixed system of the carboxyl group-containing nitrile rubber and the (meth)acrylic group-containing acid phosphate in an amount less than the theoretical value and performing the addition condensation reaction between isocyanate groups and acid groups and also a (meth)acrylic group is introduced into the molecule thereof by an ionic bond by neutralizing the remaining carboxyl group and also the remaining —P—OH group of the (meth)acrylic group-containing acid phosphate with a divalent metal compound or an aliphatic polyamine.

Examples of the acrylic monomer employed in this invention are methacrylic acid esters such as methyl methacrylate, ethyl methacrylate, propyl methacrylate, cyclohexyl methacrylate, tetrahydrofurfuryl methacrylate, 2-ethylhexyl methacrylate, etc.; same kinds of acrylic acid alkyl esters as above; hydroxyalkyl methacrylates such as 2-hydroxyethyl methacrylate, 2-hydroxypropyl methacrylate, etc.; same kinds of hydroxyalkyl acrylates as above; polymethacrylates or polyacrylates or polyhydric alcohols; epoxy polymethacrylates or polyacrylates; urethane polymethacrylates or polyacrylates, etc. They can be used solely or as a mixture of them.

The proper amount of the acrylic monomer is 40 to 90% by weight in liquid I or liquid II. In particular, a mixed system of the methacrylic acid alkyl ester the alkyl group of which has 1 to 3 carbon atoms and the hydroxyalkyl methacrylate the alkyl group of which has 2 to 4 carbon atoms is preferred in the point of adhesive performance and, if necessary, a proper amount of the foregoing polyfunctional methacrylates may be preferably added to the mixed system for improving the heat resistance, the water resistance, etc.

Examples of the organic peroxide which is a necessary component of liquid I are hydroperoxides such as t-butyl hydroperoxide, cumene hydroperoxide, p-menthane hydroperoxide, etc., and ketone peroxides such as methyl ethyl ketone peroxide, etc., but hydroperoxides are particularly preferred in this invention. The amount of the organic peroxide is 0.5 to 20% by weight, preferably 1 to 10% by weight of liquid I.

As the curing accelerator which is a necessary component in liquid II, a compound capable of decomposing the foregoing organic peroxide by a redox reaction can be used and examples of the compound are thiourea compounds such as dibutyl thiourea, ethylene thiourea, etc.; metal chelate compounds such as vanadyl acetylacetonate, cobalt acetylacetonate, etc.; and metal soaps such as manganese naphthenate, cobalt naphthenate, etc. These compounds may be used solely or as a mixture of them and the amount of the compound is 0.05 to 10% by weight, preferably 0.2 to 5% by weight of liquid II.

It has been found that the modified nitrile rubber having (meth)acrylic groups introduced therein through a covalent bond and an ionic bond can be prepared using a nitrile rubber containing a carboxyl group at the side chain and/or the terminal by the following method. That is, the nitrile rubber and the (meth)acrylic group-containing acid phosphate are dissolved in the foregoing acrylic monomer and after adding thereto a definite amount of a diisocyanate, the mixture is sufficiently stirred at 30° C. to 100° C., whereby the (meth)acrylic group is introduced into the side chain and/or the terminal of the nitrile rubber through a covalent bond. In this case, it is preferred that the amount of the diisocyanate is 0.1 to 1 equivalent per an equivalent of the carboxyl group in the nitrile rubber. If the amount of the diisocyanate is less than 0.1 equivalent, the adhesive performance is insufficient while if the amount is over 1 equivalent, the diisocyanate sometimes remains in the unreacted state. Examples of the foregoing diisocyanate are hexamethylene diisocyanate, 2,4-toluylene diisocyanate, diphenylmethane diisocyanate, etc.

Examples of the (meth)acrylic group-containing acid phosphate are 2-methacryloyloxyethyl acid phosphate, 2-acryloyloxyethyl acid phosphate, 2-methacryloyloxypropyl acid phosphate, 2-acryloyloxypropyl acid phosphate, the acid phosphate of polyethylene glycol monomethacrylate, the acid phosphate of polypropylene glycol monomethacrylate, etc. They may be used solely or as a mixture of them.

These esters can be easily prepared from, for example, hydroxyalkyl (meth)acrylates and phosphorus pentoxide at 30° C. to 100° C. as shown by the following chemical reaction formula:

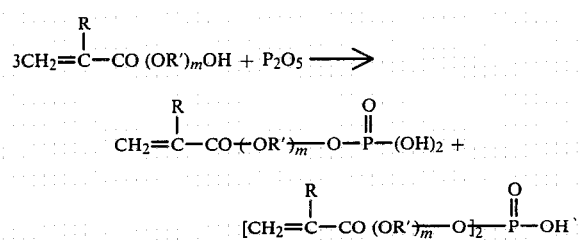

(wherein, R represents a hydrogen atom or a methyl group; R' represents an alkylene group having 2 to 4 carbon atoms; and m is an integer of 1 to 8.)

It is preferred to use the (meth)acrylate group-containing acid phosphate in such an amount that the total sum of —P—OH groups is in the range of 0.5 to 5 equivalents per equivalent of the isocyanate group of the diisocyanate. If the total sum is less than 0.5 equivalent, the covalent bond and the (meth)acrylic group contributing the graft polymerization are deficient, whereby the adhesive performance, in particular, the water resistance is insufficient, while if the total sum is over 5 equivalents, there is a tendency of reducing the curing rate to some extent.

Then, the remaining carboxyl groups of the nitrile rubber having (meth)acrylic groups introduced therein through a covalent bond thus prepared are neutralized in the presence of a (meth)acrylic group-containing acid phosphate by the addition of a divalent or more neutralizing agent of an amount less than equivalent of the total sum of acid groups with sufficiently stirring at 10° C. to 80° C. Consequently the (meth)acrylic group can be further introduced into the side chain and/or the terminal of the nitrile rubber through the ionic bond. It is considered that the neutralization reaction mainly proceeds as shown in the following equation:

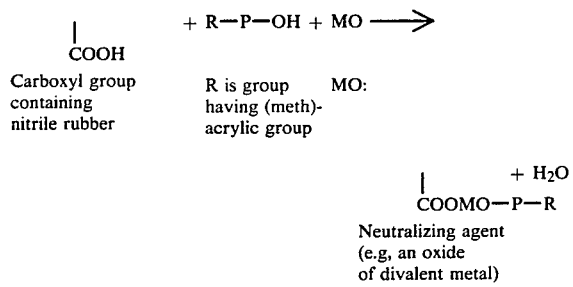

As the neutralizing agent, the oxides and hydroxides of alkaline earth metals or zinc group metals or aliphatic polyamines are suitably used and practical examples are magnesium oxide, calcium oxide, magnesium hydroxide, calcium hydroxide, barium oxide, zinc oxide, zinc hydroxide, ethylenediamine, hexamethylenediamine, triethylenediamine, diethylenetriamine, triethylenetriamine, etc. It is preferred that the addition amount of the neutralizing agent corresponds to 2 to 100%, particularly 40 to 100% of the theoretical neutralization amount of the total amount of acid groups. If the neutralizing agent is added over the theoretical amount, it sometimes happens that the system becomes turbid by the excessive neutralizing agent and the system is rendered hygroscopic by the basic property, and the addition of such an excessive amount is undesirable from the points of the appearance and the adhesive performance. Also, if the amount of the neutralizing agent is less than 2% of the theoretical amount, the amount for ionic bond and the amount of the (meth)acrylic group contributing the graft polymerization are deficient, whereby the adhesive strength becomes insufficient.

The content of the modified nitrile rubber having (meth)acrylic groups introduced therein through an ionic bond and a covalent bond thus obtained is 2 to 50% by weight, preferably 5 to 30% by weight of liquid I or liquid II.

In addition, when the nitrile rubber is not modified different from the technique of this invention, for example, when the carboxyl group of the nitrile rubber is simply addition-condensed with diisocyanate in the presence of a (meth)acrylic group-containing acid phosphate without performing neutralization or when a (meth)acrylic group-containing acid phosphate is simply added to the nitrile rubber without performing the neutralization, the graft polymerization does not proceed through the ionic bond at curing, whereby the excellent adhesive performance as the present invention is not obtained.

In this invention, it is also considered that an ionic bond is partially formed between the carboxyl groups themselves of the nitrile rubber and between the —P—OH groups themselves of the (meth)acrylic group-containing acid phosphate but the main bond is as the foregoing formula and in the composition of this invention which can perform the graft polymerization at curing, the existence of such an ionic bond-containing compound gives no trouble to the properties of the adhesive.

Also, when a part of the carboxyl groups of the nitrile rubber is not subjected to the addition condensation reaction with the diisocyanate in the presence of the (meth)acrylic group-containing acid phosphate, the graft polymerization proceeds through an ionic bond only, whereby the water resistance and weather resistance become insufficient to some extent, and also the adhesive strength is inferior to the case that (meth)acrylic groups introduced by a covalent bond and an ionic bond.

When the adhesive composition of this invention does not contain a gelation stabilizer, the adhesive composition is lacking in a long period preservative stability and hence it is preferred to add a proper amount of a gelation stabilizer to the adhesive composition of this invention.

The inventors have previously pointed out that the second-generation acrylic adhesives using a nitrile rubber as the elastomer are poor in a preservative stability and have discovered that by using following compounds (a), (b), and (c)

an organic acid salt of a metal selected from an alkali metal, zinc, and nickel, (U.S.Pat. No. 4,403,058)

(b) an organic acid salt of an aliphatic amine, (Japanese Patent Publication (unexamined) No. 27,765/'83)

(c) an ionic bond-containing unsaturated polyester [Japanese Patent Publication (unexamined) No. 96,666/'83] having one or more polymerizable and/or copolymerizable double bonds in the molecule, the remaining carboxyl groups of which are neutralized by a metal compound, ammonia, or an amine solely or as a mixture of them, the gelation stability of the adhesive composition is greatly improved and also the adhesive strength is improved in the case of using the compound (c). Accordingly, as the gelation stabilizer added, if necessary, to the adhesive composition of this invention, one or more of foregoing compounds (a), (b), and (c) are more preferably than a conventional radical polymerization inhibitor. In particular, the alkali metal salt or the aliphatic amine salt of an organic acid selected from acetic acid, acrylic acid, and methacrylic acid and the alkali metal salt or the aliphatic amine salt of an unsaturated polyester having remaining carboxyl groups are preferred. As the unsaturated polyester, a polyester obtained by the addition polymerization of a double bond-having glycidyl compound such as allyl glycidyl ether, glycidyl methacrylate, etc., and a saturated and/or unsaturated dibasic acid anhydride using a glycol as an initiator is preferred. Such a gelation stabilizer may be added to the adhesive composition before or after the preparation of the foregoing modified nitrile rubber and the addition amount thereof is 0.01 to 10% by weight, preferably 0.05 to 5% by weight of liquid I of liquid II.

The modified two-part type adhesive composition of this invention obtained as described above performs adhesion by proceeding polymerization accompanying a specific grafting mechanism and has the following excellent features, whereby the adhesive composition can largely contribute to the development of the industry.

(1) The adhesive composition of this invention has good adhesive strength as compared to a system using a conventional nitrile rubber and, in particular, is greatly excellent in peel resistance and cleavage resistance.

(2) The adhesive composition is excellent in adhesion for oily surface.

(3) The adhesive composition has good heat resistance as compared to a system of using chlorosulfonated polyethylene.

(4) When a gelation stabilizer is used, the adhesive composition shows good preservative stability.

In this invention, a small amount of paraffin wax for improving the surface curability as well as a plasticizer, a filler, a tackifier, a pigment, etc., may be added to the composition according to the uses.

Then, the invention will be explained more practically by the following examples, comparison examples, and reference examples.

In addition, the measurement of the adhesive strength and various tests were performed as follows.

Measurement of adhesive strength:

Almost the same amounts of liquid I and liquid II of the two-part type adhesive composition of this invention were separately applied to separate adherends, both the adherends were superposed with each other, and after fixing them with a clip and allowing to stand them for 24 hours at 23° C. and 50% RH, the following strengths were measured.

1. Tensile shear strength: The strength was measured according to ASTM D1002-64. As the adherend, a cold rolled steel plate, a stainless steel plate, and a copper plate each having a thickness of 16 mm (lap length being 12.5 mm) were used.
2. Impact strength: The strength was measured according to ASTM D950-54. As the adherend, a cold rolled steel stock of SS41 for general structural uses was used.
3. Peel strength: The strength was measured according to IS-4587. As the adherend, cold rolled steel plates having thicknesses of 0.5 mm and 1.6 mm, respectively, were used.
4. Cleavage strength: The strength was measured according to ASTM D1062-51. As the adherend, a cold rolled steel stock of SS41 for general structural uses.

Adhesion for oily surface: After coating the surfaces of steel plates for tensile shearing test with various kinds of oils at 1 to 2 g/m$^2$, the steel plates were bonded with each other and after allowing to stand the steel plates for 24 hours at 23° C. and 50% RH, the tensile shear strengths were measured.

Heat resistance test: After bonding steel plates for tensile shearing test and allowing to stand the steel plates for 24 hours at 23° C. and 50% RH, the steel plates were placed in a chamber kept at 40° C., 60° C., or 80° C. and then the tensile shear strength was measured at each temperature.

Thermal deterioration test: After bonding steel plates for tensile shearing test and allowing to stand the steel plates for 24 hours at 23° C. and 50% RH, the steel plates were subjected to thermal deterioration for 250 hours at 120° C. or 150° C. and then the tensile shear strength was measured at 23° C.

Water resistance test: After bonding steel plates for tensile shearing test and allowing to stand the plates for 24 hours at 23° C. and 50% RH, the steel plates were immersed in water at 23° C. or 80° C. for 250 hours and then the tensile shear strength was measured at 23° C.

REFERENCE EXAMPLE 1

Synthesis of (meth)acrylic group-containing acid phosphate:

In a reaction vessel equipped with a stirrer, a thermometer, and a condenser was charged 3 moles of each of the hydroxyalkyl (meth)acrylates shown in Table 1 and then one mole of phosphorus pentoxide was added thereto with stirring at room temperature over a period of 20 to 30 minutes. Thereafter, the reaction was performed for 4 to 6 hours at 80° C. to provide a light-yellow to light-brown transparent (meth)acrylic group-containing acid phosphate. The synthesis results are shown in Table 1.

TABLE 1

| No. | Kind of hydroxyalkyl (meth)-acrylate and molecular weight | Acid value of product | Appearance of product |
|---|---|---|---|
| I-A | 2-Hydroxyethyl methacrylate Mol. weight: 130.1 | 287 | light-yellow transparent viscous product |
| I-B | 2-Hydroxypropyl methacrylate Mol. weight: 144.2 | 273 | light-yellow transparent viscous product |
| I-C | 2-Hydroxyethyl acrylate Mol. weight: 116.1 | 283 | light-yellow transparent viscous product |
| I-D | 2-Hydroxypropyl acrylate Mol. weight: 130.1 | 248 | light-yellow transparent viscous product |
| I-E | Polyethylene glycol mono-methacrylate Mol. weight: 165.1 | 284 | light-yellow transparent viscous product |
| I-F | Polypropylene glycol mono-methacrylate Mol. weight: 390.9 | 143 | light-brown transparent viscous product |

REFERENCE EXAMPLE 2

Synthesis of potassium salt (gelation stabilizer) of unsaturated polyester:

In the reaction vessel as used in Reference example 1 were charged 6.2 g (0.1 mole) of ethylene glycol, 19.6 g (0.2 mole) of maleic anhydride, and 0.12 g of hydroquinone and after performing the reaction for 30 minutes at 70° C., 3.5 g (0.025 mole) of potassium carbonate was added to the reaction mixture. Then, 78.5 g (0.8 mole) of maleic anhydride and 125.6 g (1.1 moles) of allyl glycidyl ether were added to the mixture and the resultant mixture was stirred for 4 hours at 90° C. to provide the potassium salt of unsaturated polyester having an acid value of 0.9.

REFERENCE EXAMPLE 3

Synthesis of ethylenediamine salt (gelation stabilizer) of methacrylic acid.

In the reaction vessel as used in Reference example 1 were charged 43.1 g (0.5 mole) of methacrylic acid and 50 g of methanol and under ice-cooling, 15.0 g (0.25 mole) of ethylenediamine was added dropwise to the mixture over a period of 15 minutes. Thereafter, the mixture was stirred for 30 minutes at room temperature to precipitate the white crystals of the product, which were collected by filtration and dried to provide 50.3 g (yield: 86.5%) of the ethylenediamine salt of methacrylic acid, which was the desired product.

EXAMPLE 1 AND COMPARISON EXAMPLES 1, 2, AND 3

In the reaction vessel as used in Reference example 1 were charged 100 g of methyl methacrylate, 30 g ($21.92 \times 10^{-3}$ equivalent) of a carboxyl group-containing nitrile rubber (Nipol 1072, acid value 41.0, made by Nippon Zeon Co., Ltd.), 2 g of the potassium salt of unsaturated polyester obtained in Reference example 1, and 3.21 g ($16.44 \times 10^{-3}$ equivalent) of the 2-methacryloyloxyethyl acid phosphate obtained from 2-hydroxyethyl methacrylate I-A in Reference example 1 and phosphorus pentoxide and after uniformly dissolving the foregoing components, 0.92 g ($10.96 \times 10^{-3}$ equivalent) of hexamethylene diisocyanate was added to the mixture. Then, when the mixture was stirred for 3 hours at 70° C., the reaction proceeded while generating a carbon dioxide gas and the absorption of the isocyanate group of 2270 cm$^{-1}$ in infrared spectrum vanished. From the fact, it was confirmed that a methacrylic group was introduced into the molecule of the rubber through the amide bond. Then, a solution of 0.80 g ($13.70 \times 10^{-3}$ equivalent) of hexamethylenediamine and 70 g of 2-hydroxypropyl methacrylate was added to the reaction mixture and the mixture was stirred for one hour at 50° C. to perform the neutralization, whereby an adhesive base solution was obtained. Then, the foregoing base solution was divided into two portions, 3 g of cumene hydroperoxide was added to one of them to provide liquid I and 0.6 g of ethylene thiourea was added to the other to provide liquid II. Then, after bonding the metal plates as described above using liquid I and liquid II thus prepared, the adhesive strength was measured.

For comparison, three kinds of comparison two-part type adhesives were prepared using simply "Nipol 1072" having no methacrylic group introduced into the molecule thereof (Comparison example 1), "Nipol 1072" the carboxyl group of which was simply addition-condensated with hexamethylene diisocyanate in the co-existence of 2-methacryloyloxyethyl acid phosphate of Reference example I-A and was not neutralized (Comparison example 2), and "Nipol 1072" to which methacryloxyethyl acid phosphate of Reference example I-A was simply added and the carboxyl group of which was not neutralized (Comparison example 3) as shown in Table 2. The adhesive strength was also measured on each adhesive by the same manner as above.

The results obtained are shown in Table 3.

TABLE 2

| | Raw materials for two-part adhesives and amount (g) thereof | | | | | | | |
|---|---|---|---|---|---|---|---|---|
| | Example 1 Test 1 Liquid | | Comparison example 1 Test 2 Liquid | | Comparison example 2 Test 3 Liquid | | Comparison example 3 Test 4 Liquid | |
| Raw materials | I | II | I | II | I | II | I | II |
| Methyl methacrylate | 50 | 50 | 50 | 50 | 50 | 50 | 50 | 50 |
| "Nipol 1072" | 15 | 15 | 15 | 15 | 15 | 15 | 15 | 15 |
| 2-Methacryloyloxyethyl acid phosphate of Reference example 1 | 1.60 | 1.60 | — | — | 1.60 | 1.60 | 1.60 | 1.60 |
| Potassium salt of unsaturated polyester of Reference example 2 | 2 | 2 | 2 | 2 | 2 | 2 | 2 | 2 |
| Hexamethylene diisocyanate | 0.46 | 0.46 | — | — | 0.46 | 0.46 | — | — |
| 2-Hydroxypropyl methacrylate | 35 | 35 | 35 | 35 | 35 | 35 | 35 | 35 |
| Hexamethylene diamine | 0.40 | 0.40 | — | — | — | — | — | — |
| Cumene hydroperoxide | 3 | — | 3 | — | 3 | — | 3 | — |
| Ethylene thiourea | — | 0.6 | — | 0.6 | — | 0.6 | — | 0.6 |

TABLE 3

| | Tensile shear strength (kg/cm$^2$)* | Impact strength (kg · cm/cm$^2$) | Peel strength (kg/inch) | Cleavage strength (kg/inch) |
|---|---|---|---|---|
| Example 1 | 253 | 26 | 21 | 872 |
| Comparison example 1 | 195 | 5 | 7 | 681 |
| Comparison example 2 | 224 | 17 | 16 | 715 |
| Comparison example 3 | 208 | 12 | 14 | 737 |

*Steel plate/steel plate

As is clear from Table 3, it is understood that the two-part type adhesive of this invention is excellent in all the strengths, in particular, very excellent in impact strength and peel strength as compared to the comparison samples.

TABLE 4

| | Adhesion for oily surface Tensile shear strength (Kg/cm$^2$) | | | | | |
|---|---|---|---|---|---|---|
| | (A) | (B) | (C) | (D) | (E) | (F) |
| Example 1 | 243 | 218 | 215 | 223 | 217 | 209 |
| Comparison example 1 | 177 | 164 | 181 | 159 | 140 | 135 |
| Comparison example 2 | 209 | 184 | 177 | 170 | 187 | 152 |
| Comparison example 3 | 195 | 189 | 182 | 162 | 166 | 148 |

(A): Cutting oil.
(B): Gear oil.
(C): Anticorrosion oil.
(D): Spindle oil.
(E): Silicone oil.
(F): Grease.

As is clear from Table 4, it is understood that the two-part type adhesive of this invention shows excellent adhesion for oily surface.

TABLE 5

| | Heat resistance test result: Tensile shear strength (Kg/cm$^2$) | | |
|---|---|---|---|
| | 40° C. | 60° C. | 80° C. |
| Example 1 | 192 | 113 | 86 |
| Comparison example 1 | 130 | 83 | 61 |
| Comparison example 2 | 157 | 102 | 73 |
| Comparison example 3 | 136 | 91 | 65 |

As is clear from Table 5, it is understood that the two-part type adhesive of this invention shows excellent heat resistance.

TABLE 6

| | Water resistance test result: Tensile shear strength (Kg/cm$^2$) | |
|---|---|---|
| | 23° C. | 80° C. |
| Example 1 | 225 | 194 |
| Comparison example 1 | 162 | 141 |
| Comparison example 2 | 172 | 155 |
| Comparison example 3 | 170 | 138 |

As is clear from Table 6, it is understood that the two-part type adhesive of this invention has excellent water resistance.

EXAMPLES 2, 3, 4, AND 5 AND COMPARISON EXAMPLES 4, 5, AND 6

Two-part type adhesives were prepared using the raw materials shown in Table 7 and with the amounts thereof shown in the same table by the same manner as in Example 1 and after bonding the steel plates using the two-part type adhesives, the adhesive strength was measured in each case (Examples 2, 3, 4, and 5).

For comparison, the foregoing bonding test was performed using a commercially available chlorosulfonated polyethylene-containing second generation acrylic adhesive (Comparison example 4), a nitrile rubber-containing second-generation acrylic adhesive (Comparison example 5), and a two-part room temperature curing type epoxy adhesive (Comparison example 6), respectively and the adhesive strength was measured in each case. The results are shown in following tables.

TABLE 7

| | Raw materials of two-part adhesives and amounts (g) thereof: | | | | | | | |
|---|---|---|---|---|---|---|---|---|
| | Example 2 Test 5 | | Example 3 Test 6 | | Example 4 Test 7 | | Example 5 Test 8 | |
| Raw materials | I | II | I | II | I | II | I | II |
| Methyl methacrylate | 40 | 40 | 45 | 45 | 43 | 43 | 40 | 40 |
| "Nipol 1072" | 20 | 20 | 15 | 15 | 17 | 17 | 15 | 15 |
| Methacryloyloxypropyl acid phosphate of Reference example I-B | 2.40 | 2.40 | — | — | — | — | — | — |
| Acryloyloxyethyl acid phosphate of Reference example I-C | — | — | 1.63 | 1.63 | — | — | — | — |
| Acid phosphate of polyethylene glycol monomethacrylate of Reference example I-E | — | — | — | — | 1.77 | 1.77 | — | — |
| Acid phosphate of polypropylene glycol monomethacrylate of Reference example I-F | — | — | — | — | — | — | 3.44 | 3.44 |
| Potassium salt of unsaturated polyester of Reference example 2 | 2 | 2 | — | — | 2 | 2 | — | — |
| Ethylenediamine salt of methacrylic acid of Reference example 3 | 0.1 | 0.1 | 0.3 | 0.3 | 0.2 | 0.2 | — | — |
| 2-Hydroxyethyl methacrylate | — | — | 40 | 40 | 35 | 35 | — | — |
| 2-Hydroxypropyl methacrylate | 35 | 35 | — | — | — | — | 40 | 40 |
| Trimethylolpropane triacrylate | 5 | 5 | — | — | 5 | 5 | 5 | 5 |
| 2,4-Toluylene diisocyanate | 0.51 | 0.51 | — | — | — | — | — | — |
| Hexamethylene diisocyanate | — | — | 0.46 | 0.46 | — | — | 0.37 | 0.37 |
| Diphenylmethane diisocyanate | — | — | — | — | 0.70 | 0.70 | — | — |
| Magnesium oxide | 0.12 | 0.12 | — | — | — | — | — | — |
| Calcium oxide | — | — | 0.15 | 0.15 | — | — | — | — |
| Ethylenediamine | — | — | — | — | 0.28 | 0.28 | — | — |
| Hexamethylenediamine | — | — | — | — | — | — | 0.45 | 0.45 |
| Cumene hydroperoxide | 4 | — | 3 | — | — | — | 3 | — |
| Diisopropylbenzene hydroperoxide | — | — | — | — | 4 | — | — | — |
| Ethylenethiourea | — | 0.5 | — | 0.6 | — | — | — | 0.6 |
| Tetramethylthiourea | — | — | — | — | — | 0.7 | — | — |

TABLE 8

| | Measurement results of various adhesive strengths | | | | | |
|---|---|---|---|---|---|---|
| | Tensile shear strength (Kg/cm$^2$) | | | Impact strength (Kg·cm/cm$^2$) | Peel strength (Kg/inch) | Cleavage strength (Kg/inch) |
| | St./st. | Cu/Cu | Stn. st./stn. st. | | | |
| Example 2 | 261 | 151 | 211 | 21 | 20 | 765 |
| Example 3 | 259 | 143 | 216 | 23 | 21 | 863 |
| Example 4 | 244 | 138 | 227 | 24 | 21 | 827 |
| Example 5 | 252 | 147 | 214 | 22 | 21 | 884 |
| Comparison example 4 | 273 | 6 | 157 | 30 | 11 | 598 |
| Comparison example 5 | 188 | 125 | 129 | 17 | 15 | 657 |
| Comparison example 6 | 120 | 112 | 102 | 25 | 13 | 554 |

St./st.: Steel plate/steel plate;
Cu/Cu: Copper plate/copper plate;
Stn. st./stn. st.: Stainless steel plate/stainless steel plate.
Comparison example 4: Commercially available chlorosulfonated polyethylene-containing second-generation acrylic adhesive
Comparison example 5: Commercially available nitrile rubber-containing second-generation acrylic adhesive
Comparison example 6: Commercially available two-part room temperature curing type epoxy adhesive.

As is clear from Table 8, it is understood that the two-part type adhesives of this invention are excellent in various adhesive strengths and are particularly excellent in peel strength and cleavage strength.

In addition, when the preservative stability of each of the samples in Examples 2, 3, 4, and 5 at 50° C. was investigated, liquid II of each two-part type adhesive was stable for longer than 10 days. On the other hand, while liquid I of each of the samples in Examples 2, 3 and 4 containing the gelation stabilizer was stable for longer than 10 days, liquid I of the sample in Example 5 containing no gelation stabilizer caused gelation after 3 days.

TABLE 9

| | Thermal deterioration test result: Tensile shear strength (Kg/cm$^2$) after thermal deterioration | |
|---|---|---|
| | 120° C. | 150° C. |
| Example 2 | 285 | 292 |
| Example 3 | 302 | 310 |
| Example 4 | 296 | 284 |
| Example 5 | 288 | 291 |
| Comparison example 4 | 155 | 128 |
| Comparison example 5 | 219 | 236 |
| Comparison example 6 | 207 | 211 |

As is clear from Table 9, when the two-part type adhesives of this invention were heated for a long period of time, they show no deterioration and on the contrary, there is a tendency of increasing the strengths at high temperature as compared with the case at normal state. On the other hand, the second-generation acrylic adhesive containing chlorosulfonated polyethylene in Comparison example 4 showed great reduction in strength and the adhered portions were blackened.

EXAMPLE 6 AND COMPARISON EXAMPLES 7 AND 8

Two-part type adhesives were prepared using the raw materials shown in Table 10 and the amounts thereof shown in the same table by the same manner as in Example 1 and after bonding metals using the adhesives, the adhesive strengths were measured in each case.

For comparison, the bonding test was performed about each of the adhesives (Comparison examples 7 and 8) each prepared by neutralizing a system containing 2-acryloyloxypropyl acid phosphate of Reference example I-D or methacrylic acid with diethylenetriamine to introduce methacrylic groups into the molecule of the rubber through an ionic bond only, and the adhesive strength was measured in each case.

TABLE 10

| | Raw materials for two-part adhesives and amounts (g) | | | | | |
|---|---|---|---|---|---|---|
| | Example 6 Test 9 Liquid | | Comparison Example 7 Test 10 Liquid | | Comparison Example 8 Test 11 Liquid | |
| Raw material | I | II | I | II | I | II |
| Methyl methacrylate | 45 | 45 | 45 | 45 | 45 | 45 |
| 2-Hydroxychloropropyl methacrylate | 30 | 30 | 30 | 30 | 30 | 30 |
| 2',2'-Bis(4-methacryloxydiethoxyphenyl)propane | 10 | 10 | 10 | 10 | 10 | 10 |
| "Nipol 1072" | 15 | 15 | 15 | 15 | 15 | 15 |
| 2-Acryloyloxypropyl acid phosphate of Reference example I-D | 1.98 | 1.98 | 1.98 | 1.98 | — | — |
| Methacrylic acid | — | — | — | — | 0.75 | 0.75 |
| Ethylenediamine salt of methacrylic acid of Reference Example 3 | 0.3 | 0.3 | 0.3 | 0.3 | 0.3 | 0.3 |
| Diphenylmethane diisocyanate | 0.55 | 0.55 | — | — | — | — |
| Diethylenetriamine | 0.26 | 0.26 | 0.26 | 0.26 | 0.26 | 0.26 |
| Cumene hydroperoxide | 4 | — | 4 | — | 4 | — |
| Acetylthiourea | — | 1 | — | 1 | — | 1 |

TABLE 11

| | Measurement results of various adhesive strengths | | | |
|---|---|---|---|---|
| | Tensile shear strength (Kg/cm$^2$)* | Impact strength (Kg·cm/cm$^2$) | Peel strength (Kg/inch) | Cleavage strength (Kg/inch) |
| Example 6 | 251 | 24 | 20 | 770 |
| Comparison example 7 | 215 | 20 | 15 | 701 |
| Comparison example 8 | 206 | 17 | 9 | 468 |

*Steel plate/steel plate

As is clear from Table 11, it is understood that the two-part adhesive of this invention is excellent in all the strengths as compared to comparison examples. In addition, the adhesive of Comparison example 8 using methacrylic acid in place of 2-acryloyloxypropyl acid phosphate as the acid is greatly inferior in peel strength and cleavage strength.

COMPARISON EXAMPLE 9

An adhesive was prepared by the same procedure as in Example 1 except that 1.42 g (16.44×10$^{-3}$ equivalent) of methacrylic acid was used in place of 2-methacryloyloxyethyl acid phosphate in Example 1. After "Nipol 1072" was dissolved, hexamethylene isocyanate was added thereto at 70° C. followed by stirring, whereby the total composition gelled after 10 minutes.

COMPARISON EXAMPLE 10

An adhesive was prepared by the same procedure as in Example 1 except that 1.96 g (6.58×10$^{-3}$ equivalent, which corresponded to 0.3 equivalent per equivalent of the carboxyl group of "Nipol 1072") of the isocyanate group-containing methacrylate which was addition reaction product of 2-hydroxyethyl methacrylate/hexamethylene diisocyanate (1:1 by mole ratio) was used in place of 2-methacryloyloxyethyl acid phosphate in Example 1. After "Nipol 1072" was dissolved, the foregoing isocyanate-containing methacrylate was added thereto at 70° C. followed by stirring, whereby the whole composition gelled after 6 minutes.

COMPARISON EXAMPLE 11

An adhesive was prepared by the same procedure as in Example 1 except that 2-methacryloyloxyethyl acid phosphate in Example 1 was not used. After "Nipol 1072" was dissolved, hexamethylene diisocyanate was added followed by stirring, whereby the whole composition was gelled after 5 minutes.

What is claimed is:

1. A modified two-part type adhesive composition, which comprises liquid I comprising an acrylic monomer, an organic peroxide, and a gelation stabilizer and liquid II comprising of an acrylic monomer, a curing accelerator, and a gelation stabilizer, at least one of said liquids containing a modified nitrile rubber in an amount of 2 to 50% by weight; said modified nitrile rubber containing carboxyl groups prior to being modified, said modified nitrile rubber having after modification:
   (1) a portion of said carboxyl groups addition condensed with a diisocyanate and a (meth)acrylic group-containing acid phosphate, whereby said (meth)acrylic group-containing acid phosphate is covalently bonded to said modified nitrile rubber, and
   (2) remaining carboxyl groups neutralized with a neutralizing agent selected from the group consisting of a divalent metal compound and a polyamine in the presence of a (meth)acrylic group-containing acid phosphate, whereby said (meth)acrylic group-containing acid phosphate is ionically bonded to said modified nitrile rubber.

2. The modified two-part type adhesive composition as claimed in claim 1, wherein the (meth)acrylic group-containing acid phosphate is a compound shown by general formula I:

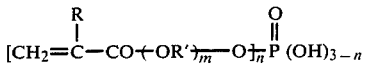

(wherein R represents a hydrogen atom or a methyl group; R' represents an alkylene group having 2 to 4 carbon atoms; m is an integer of 1 to 8; and n is 1 or 2) and the amount of the compound is that the —P—OH group is 0.5 to 5 equivalents per equivalent of the isocyanate group of the diisocyanate.

3. The modified two-part type adhesive composition as claimed in claim 1, wherein the gelation stabilizer is at least one member selected from the group consisting of following compounds (a), (b), and (c)
   (a) an organic acid salt of a metal selected from the group consisting of an alkali metal, zinc, and nickel;
   (b) an organic acid salt of an aliphatic amine; and
   (c) an ionic bond-containing unsaturated polyester having at least one polymerizable double bond in the molecule, the remaining carboxyl group thereof being neutralized by a metal compound, ammonia, or an amine.

4. The modified two-part type adhesive composition as claimed in claim 1, wherein the curing accelerator is at least one member selected from the group consisting of of a thiourea compound, a metal chelate compound and a metal soap.

5. The modified two-part type adhesive composition as claimed in claim 4, wherein the thiourea compound is dibutylthiourea or ethylenethiourea.

6. The modified two-part type adhesive composition as claimed in claim 4, wherein the metal chelate compound is vanadyl acetylacetate or cobalt acetylacetonate.

7. The modified two-part type adhesive composition as claimed in claim 4, wherein the metal soap is manganese naphthenate or cobalt naphthenate.

8. The modified two-part type adhesive composition as claimed in claim 1, wherein said gelation stabilizer is an organic acid salt of an aliphatic amine.

9. The modified two-part type adhesive composition as claimed in claim 8, wherein said salt is an acetic acid, acrylic acid or methacrylic acid salt.

10. The modified two-part type adhesive composition as claimed in claim 3, wherein said unsaturated polyester (c) is a compound obtained by the addition polymerization of a double bond-containing glycidyl compound and a saturated or unsaturated dibasic acid anhydride using glycol as an initiator.

11. The adhesive according to claim 1 wherein said modified nitrile rubber comprises 0.1 to 1 equivalent of said diisocyanate per equivalent of carboxyl groups in said nitrile rubber.

12. The adhesive according to claim 11, wherein said addition condensed (meth)acrylic-containing acid phosphate is 0.5 to 5 P—OH equivalents per equivalent of isocyanate group in said addition condensed diisocyanate.

13. The adhesive according to claim 1, wherein said neutralizing agent is 2 to 100% of the theoretical neutralization amount of the total amount of said groups.

* * * * *